US008943567B2

(12) United States Patent
Jussila

(10) Patent No.: US 8,943,567 B2
(45) Date of Patent: Jan. 27, 2015

(54) AUTHENTICATION OF PERSONAL DATA OVER TELECOMMUNICATIONS SYSTEM

(75) Inventor: Olli Matti Jussila, Järvenpää (FI)

(73) Assignee: Teliasonera AB, Stockholm (SE)

( * ) Notice: Subject to any disclaimer, the term of this patent is extended or adjusted under 35 U.S.C. 154(b) by 303 days.

(21) Appl. No.: 13/267,084

(22) Filed: Oct. 6, 2011

(65) Prior Publication Data
US 2012/0088473 A1    Apr. 12, 2012

(30) Foreign Application Priority Data

Oct. 6, 2010 (FI) ...................................... 20106032

(51) Int. Cl.
G06F 7/04       (2006.01)
G06F 15/16      (2006.01)
G06F 17/30      (2006.01)
H04L 29/06      (2006.01)
H04W 12/06      (2009.01)

(52) U.S. Cl.
CPC ........... *H04L 63/0853* (2013.01); *H04W 12/06* (2013.01)
USPC .................................................. 726/7; 380/46

(58) Field of Classification Search
USPC ........................................................... 726/7
See application file for complete search history.

(56) References Cited

U.S. PATENT DOCUMENTS

| | | | |
|---|---|---|---|
| 6,704,789 B1 * | 3/2004 | Ala-Laurila et al. | 709/230 |
| 6,775,298 B1 * | 8/2004 | Aggarwal | 370/473 |
| 7,508,786 B2 * | 3/2009 | Do | 370/328 |
| 8,442,527 B1 * | 5/2013 | Machiraju et al. | 455/435.1 |
| 2002/0187808 A1 * | 12/2002 | Vallstrom et al. | 455/558 |
| 2003/0033528 A1 * | 2/2003 | Ozog et al. | 713/170 |
| 2003/0130856 A1 * | 7/2003 | Matsuo | 705/1 |
| 2004/0030930 A1 * | 2/2004 | Nomura | 713/201 |
| 2005/0120221 A1 * | 6/2005 | Arnold et al. | 713/182 |
| 2005/0132214 A1 * | 6/2005 | Naftali | 713/200 |
| 2006/0075222 A1 * | 4/2006 | Moloney et al. | 713/156 |
| 2006/0245408 A1 * | 11/2006 | Lee et al. | 370/338 |
| 2007/0037563 A1 * | 2/2007 | Yang et al. | 455/418 |
| 2009/0068988 A1 * | 3/2009 | Cofta | 455/411 |
| 2010/0082492 A1 * | 4/2010 | Jarman et al. | 705/67 |
| 2010/0239093 A1 * | 9/2010 | Hotta | 380/270 |

FOREIGN PATENT DOCUMENTS

| | | |
|---|---|---|
| EP | 1835688 A1 | 9/2007 |
| JP | 2003152895 A | 5/2003 |
| JP | 2006079293 A | 3/2006 |

OTHER PUBLICATIONS

Rachna Dhamija;The Battle Against Phishing:Dynamic Security Skins ;University of California, Berkeley; 2005, pp. 77-88.*

(Continued)

*Primary Examiner* — Mohammad W Reza
*Assistant Examiner* — Monjour Rahim
(74) *Attorney, Agent, or Firm* — Cozen O'Connor

(57) ABSTRACT

An additional service that authenticates personal information of a second person by using the mobile identification service in response to a first person requesting authentication is provided. As a result, the authenticated personal information of the second person is shown to the first person.

19 Claims, 4 Drawing Sheets

(56) References Cited

OTHER PUBLICATIONS

European Search Report based on European Application No. 11183898.3 dated Dec. 22, 2011.

Finland Search Report based on Finland Application No. 20106032 dated Jun. 1, 2011.

* cited by examiner ns of the subscriber identity module can identify himself/herself in different web services with the mobile ID. In the mobile ID scheme, when a user logs in a service, the user gives his/her mobile phone number or a user name by means of which the mobile number may be resolved, and a server providing the service sends an authentication request to a mobile signature service provider (MSSP) which is the user's operator or a trusted third party service provider and associates the keypair with proper personal data of the person. MSSP creates and sends an encrypted flash short message to the user's authentication application in the SIM in the mobile phone, the flash short message informing the user that he/she is trying to log in the service and requesting the user to enter a password the user has himself selected for mobile ID authentication, if the user wants to log in the service indicated in the flash short message. The flash short message is decrypted by the authentication application in the mobile device in which the subscriber identity module is, and the content is shown to the user. The user enters the password via the user interface, the authentication application checks the password, creates a message indicating the outcome of the check, encrypts the message (i.e. signs the received request) and the mobile device sends the message to MSSP. MSSP decrypts the message thereby verifying the user and forwards the authentication outcome to the service. If the outcome is positive, the service is opened for the user. In the process, MSSP uses a public key and the authentication application a corresponding private key.

A problem with the solution is that the mobile ID can be used only for web services, either to log in the service for using the service or for signing documents; there are no mechanisms to use the mobile ID scheme to verify a user's identity to another user (person), for example. A straightforward implementation scenario would be that mobile devices would contain an authentication service to which other users may log in, the service in the mobile device performing the above described functionality of the server and sending after a successful log in some pieces of the mobile device user's personal information to the person using the other device. However, logging in a service that locates in another person's mobile device requires address information of the service in the other person's mobile device and a public key of the other person in the mobile device of a user wanting to obtain trustworthy personal information on the other person. This is a rather complicated solution and very difficult to implement.

US 8,943,567 B2

AUTHENTICATION OF PERSONAL DATA OVER TELECOMMUNICATIONS SYSTEM

CROSS-REFERENCE TO RELATED APPLICATION

This application claims priority under 35 USC §119 to Finland Application No. 20106032 filed on Oct. 6, 2010 which is incorporated by reference in its entirety.

FIELD

The invention relates to the field of telecommunications and, particularly, to providing authentication of personal data over a telecommunications system so that a person can verify in a trustworthy manner to another person that personal data given by him/her is correct.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The amount of web-based services requiring some kind of user authentication has increased rapidly over the last years, thanks to the evolvement of electronic identification schemes and secured communications technologies. Examples of such web-based services include online banking, different payment services, online services provided by state authorities, such as requesting a tax deduction card online, different social medias, etc. Typically each service provider decides how the user is authenticated or his/her identification verified so that the user is allowed to access the service.

One of the newest solutions for secure identification and digital signatures, intended for different web-services, is a SIM-based mobile ID scheme utilizing wireless public key infrastructure. In the mobile ID scheme, also called a mobile certificate scheme, an asymmetric cryptographic keypair is securely stored with a corresponding authentication application on a subscriber identity module (SIM). A person who is in possessio

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An aspect utilizes co-operation and trust between different operators (or service providers) selling subscriptions for users, and provides to operators' subscribers in a communications system a common service that allows the above described mobile ID scheme to be used for person-to-person authorization of personal data, such as pieces of personal identity information.

Various aspects of the invention comprise a method, a computer program product, an apparatus and a system as defined in the independent claims. Further embodiments of the invention are disclosed in the dependent claims.

BRIEF DESCRIPTION OF THE DRAWINGS

In the following, different embodiments will be described in greater detail with reference to the attached drawings, in which.

DETAILED DESCRIPTION OF SOME EMBODIMENTS

Exemplary embodiments of the present invention will now be described more fully with reference to the accompanying drawings, in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any apparatuses providing server functionality and/or to any communication system or any combination of different communication systems supporting the above described mobile ID scheme, or a corresponding scheme utilizing an electronic identity securely associated with digital means used for identifying a subscriber in a communications system. The communication system may be a wireless communication system or a communication system utilizing both fixed networks and wireless networks. The protocols used and the specifications of communication systems, and apparatuses, especially in wireless communication, develop rapidly. Such development may require extra changes to an embodiment. Therefore, all words and expressions should be interpreted broadly and are intended to illustrate, not to restrict, the embodiment.

Figure 1:
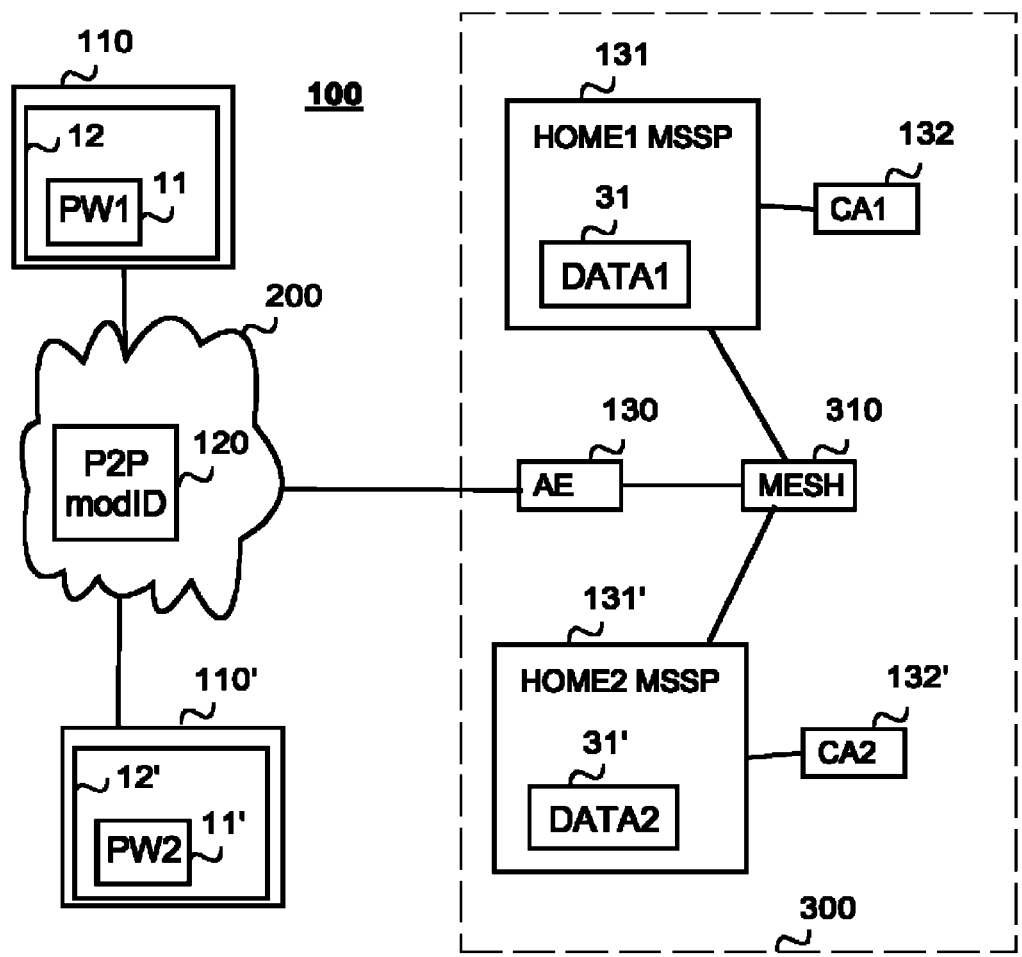
FIG. 1 shows a simplified architecture of an exemplary system and schematic diagrams of some mobile devices.

A general architecture of a system 100 providing a person-to-person identification service is illustrated in FIG. 1. FIG. 1 is a simplified architecture only showing some apparatuses, elements and functional entities, all being logical units whose implementation may differ from what is shown.

A mobile device 110, 110' refers to a computing device operating with a subscriber identification module (SIM), including, but not limited to, the following types of portable wireless mobile communication devices: mobile phone, smartphone, personal digital assistant (PDA), handset, laptop computer, e-reading device, tablet. The mobile device 110, 110' is configured to perform one or more of mobile device functionalities described below with an embodiment, and it may be configured to perform functionalities from different embodiments. For this purpose, the mobile device comprises a mobile ID 11, 11' securely stored in SIM 12. 12' for providing authentication of personal data, as will be described below, and for storing some pieces of personal data, at least a password (may also called personal identification number, PIN) for the mobile ID. The mobile ID comprises an authentication application and a keypair of a public key and a private key. The mobile ID, or more precisely the authentication application, may be implemented with a SIM application toolkit. The SIM application toolkit consists of a set of commands programmed into SIM which define how SIM should interact directly with the outside world and initiates commands independently of the actual device in which SIM is and the network. This enables the mobile ID in SIM to build up an interactive exchange ending up to obtaining authenticated personal data on another person, as will be described below. The SIM application toolkit also gives commands to the actual device, such as display menu and asks for user input. The keypair is used only by the authentication application, keys or keypairs for other purposes being separately stored and used.

It should be appreciated that SIM covers here its equivalents and corresponding modules like a universal integrated circuit card, a removable user identity module, a removable flash memory card, and an embedded secure computing hardware. Further, the mobile device comprises other units and modules not shown, such as a network interface, SIM interface and a user interface.

In the illustrated example, there are a separate server 120 containing the common person-to-person mobile ID service (P2P modID), described in more detail below, and a separate acquirer entity (AE) 130. However, they may be integrated together.

The acquirer entity is a computing device providing an interface to authentication and the identity provider service. The acquirer entity belongs in the illustrated example to a mobile signature service provider (MSSP) system 300 which is a secured mesh 310 formed by different mobile signature service providers 131, 131' who utilize certificate issuing authorities 132, 132'. The mesh provides roaming for mobile ID service. A mobile signature service provider 131, 131' is a trusted third party providing a basic trust level for a user provided identity and it generates keypairs. During a person's registration to the mobile ID service, a certificate issuing authority 132, 132' issues a digital certificate comprising the public key and basic personal data (identity information) by the request of a home mobile signature service provider, i.e. the service provider to whom the person registers. Typically a person subscribes the service from the person's operator who co-operates with a mobile signature service provider, and the system 300 is a trust domain of operators providing the service in cooperation. The digital certificate is stored in a secured environment of the mobile signature service provider and associated with the person's true identity and personal data 31, 31'. The personal data 31, 31' may include, in addition to the certified identity information, additional information provided by the person. Examples of the additional information include an email address and a photo. The keypair may be stored to SIM before the delivery of SIM, or over the air commands may be used to generate and store the keypair.

However, it should be appreciated that the implementation details of the mobile signature service provider (MSSP) system, or a corresponding system authenticating person's personal data, bears no significance for the invention and therefore other solutions may be used.

The network(s) 200 over which the mobile devices may communicate with each other and/or with the person-to-person mobile ID server may use third generation (3G) GSM/EDGE, WiMax, a combination of long term evolution (LTE) and an evolved packet core network (EPC), a combination of LTE-advanced and EPC, and other fourth generation (4G) cellular network technologies, or different combinations of them. It should be appreciated that although the mobile signature service provider system has been illustrated separately from the network 200, the apparatuses and devices may use the same network infrastructure with the acquirer entity and/or for information exchange.

Although the apparatuses, such as the mobile devices, the server, and the authentication entity have been depicted in FIG. 1 as one entity, they may be implemented in one or more physical or logical entities. Their units and functions may be software and/or software-hardware and/or firmware components (recorded indelibly on a medium such as a read-only-memory or embodied in a hard-wired computer circuitry).

Figure 2:
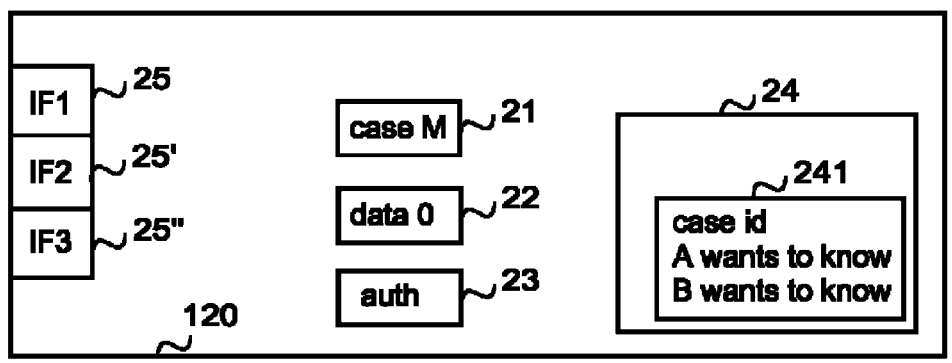
FIG. 2 is a schematic diagram of a server apparatus according to an embodiment.

FIG. 2 illustrates an exemplary block diagram of an apparatus providing the person-to-person mobile ID service. For the sake of clarity the apparatus, or a corresponding component, is herein called a server. The server 120 is a computing device configured to perform one or more of server functionalities described below with an embodiment, and it may be configured to perform functionalities from different embodiments. For this purpose, the exemplary server illustrated in FIG. 2 comprises a case management unit (caseM) 21, a data obtaining unit (dataO) 22, an authenticating unit (auth) 23, and at least one memory 24 for storing service related information at least for the case management unit. In the illustrated example the case management unit 21 is configured to manage different service requests, including detecting whether the service is requested by a user or by a service provider, mapping of requests to pending requests, requesting the authentication unit to take care of authentication, and requesting the data obtaining unit to obtain requested data when authentication is received, and taking care that the information delivered is what was requested, for example. The case managing unit may also be configured to generate session identifiers and/or to detect registered users and to provide additional data, such as photos, or a link to identification card stored in the Internet (provided as one-time-web-link which is valid only for a short time), on the registered users without a specific request. The data obtaining unit 22 is configured to obtain data from a storage storing personal data. The storage may be in SIM, or in a mobile ID in SIM, in a mobile device, in which case it may be obtained as described below or separately requested from the mobile ID/SIM after a successful authentication. The storage may be part of the server or a separate storage containing information stored by the operator as a part of a mobile ID subscription and verified when the subscription is ordered, or the information may be obtained from two or more storages, for example the user's age from the mobile ID and a location from a home subscriber location register of the end user's operator, or from a GPS or corresponding location application in the mobile device, or requested from the user, for example. The information may be stored operator-specifically in storages. There are no restrictions as to where and how the personal data is stored; the means of obtaining it after the user's mobile subscriber international number, such as MSISDN, has been resolved, is well known for one skilled in the art and will not be described in detail here. Depending on an implementation, the authentication unit 23 is configured to perform the authentication, i.e. act as an authentication entity, or request the authentication entity for authentication.

The memory 24, or memories, comprises at least space for different pending case entries 241 so that the mapping may be performed on the basis of a case identifier (case id). In the illustrated example, a case entry also includes for each case an indication of the information one party (for example A) requested from the other party (B) so that the proper information may be sent in a response. Examples of this will be given below.

The server comprises different interface units 25, 25',25", an interface unit including a transmitter and/or a receiver or a corresponding means for receiving and/or transmitting information, such as data, content, control information, messages, and performing necessary functions so that user data, content, control information, signalling and/or messages can be received and/or transmitted. In the illustrated example there is at least an interface for service providers, an interface for service requests/responses and an interface for authentication. However, it suffices that there is an interface enabling information exchange.

Each of the units may be a separate unit or integrated to another unit, or the units may be integrated together. It should be appreciated that the server may comprise other units used in or for person-to-person mobile ID service. However, they are irrelevant to the actual invention and, therefore, they need not be discussed in more detail here.

The server and corresponding apparatuses implementing functionality or some functionality according to an embodiment may generally include a processor (not shown in FIG. 2), controller, control unit, micro-controller, or the like connected to a memory and to various interfaces of the apparatus. Generally the processor is a central processing unit, but the processor may be an additional operation processor. The case management unit 21, and/or the data obtaining unit 22 and/or the authentication unit 23 may be configured as a computer or a processor, or a microprocessor, such as a single-chip computer element, or as a chipset, including at least a memory for providing storage area used for arithmetic operation and an operation processor for executing the arithmetic operation. The case management unit 21, and/or the data obtaining unit 22 and/or the authentication unit 23 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed to carry out one or more functions of one or more embodiments.

The server may generally further include volatile and/or non-volatile memory and, typically, store data, or the like. For example, the memory may store computer program code such as software applications (for example, for the uplink multiplexing unit or the resource assigner unit) or operating systems, information, data, content, or the like for the processor to perform steps associated with an operation of the server in accordance with embodiments. The memory may be, for example, random access memory, a hard drive, or other fixed data memory or storage device. Further, the memory, or part of it, may be removable memory detachably connected to the apparatus.

In the following, different embodiments and examples will be described using the above described mobile ID service using a wireless public key infrastructure and flash short messages, without, however, restricting the embodiments to such an implementation of the mobile ID service. Advantages provided by the flash short messages include that they are not stored to the message memory of the user card and that they are directly shown to user. The flash short messages are preferably binary short messages. Instead of a flash short message, a conventional short message, a push message, like a WAP (wireless access protocol) message, or a secure generic bootstrapping architecture push message could be user. Requests for a person-to-person mobile ID service may also be made via the Internet (the person uses a web interface to enter the required information, like a phone number) or by using WAP.

In the examples below, it is assumed that all users have a mobile ID, and, for clarity's sake, no check for a user's right to use the service is illustrated although the check is performed in real life implementations.

Figure 3:
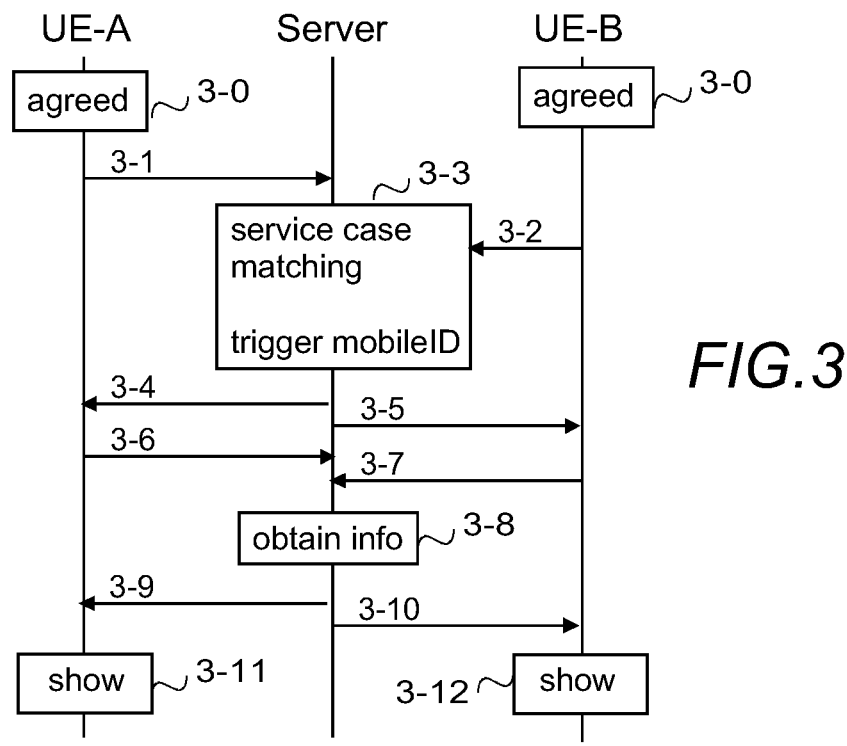
FIGS. 3 to 5 illustrate examples of signalling.
Figure 4:
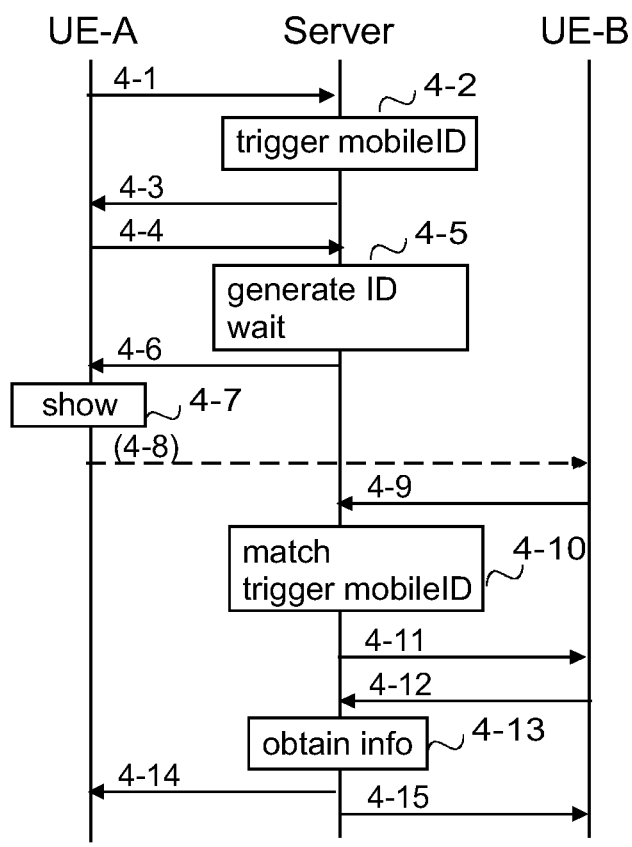
Figure 5:
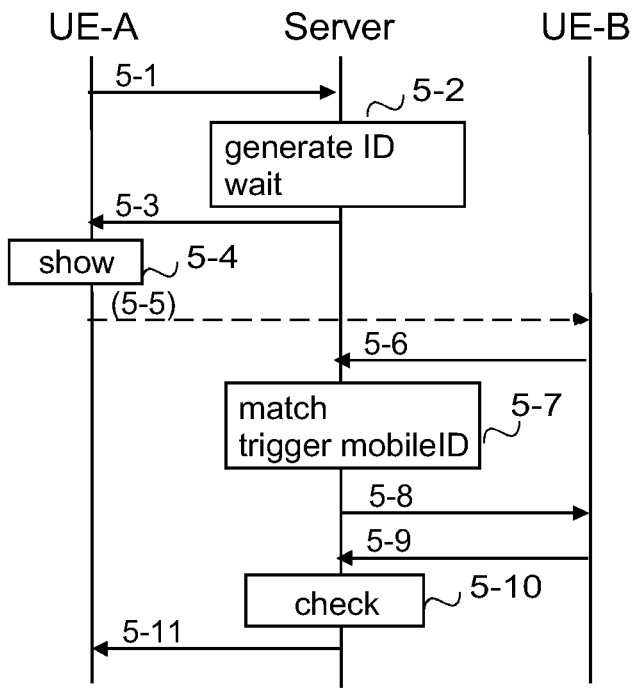

Further, in the examples illustrated in FIGS. 3 to 5, the term "server" covers an apparatus providing person-to-person mobile ID service, corresponding service functionalities, authentication entity functionalities, and functionalities of a person's home MSSP, information exchange during authentication phase being simplified to take place between the server and UE, since no modifications to the information exchange and encryption decryption scheme between the link AE-home MSSP-mobile device is required. In addition, the term "mobile device", or UE, covers also the subscriber identity module containing the mobile ID and corresponding functionalities, although not explicitly mentioned each time to the sake of clarity.

FIG. 3 is a simplified chart illustrating a signalling example according to an embodiment in which personal data for registered users is maintained at least in a server and in which a session identifier agreed on by the users is used as a case identifier. Here, a registered user means a user specifically registered to the person-to-person mobile ID service. Registering to the person-to-person mobile ID service is not necessary but additional services, like reviewing logs and setting a private prompt, may be provided to registered users. In the illustrated example it is assumed that Anna has chatted in an Internet dating service with Bert and they want to meet face-to-face for the first time. Before having a date Anna wants to know if Bert is really Bert Smith, a 26-year-old man, and Bert wants to be sure that Anna is over 20 years. Therefore Bert suggest, in the Internet dating service, to use a person-to-person mobile ID service with a random session code "dating11" for verifying personal information. The random session code covers here session codes made up by a user, or agreed with users. Instead of a random session code, a code predefined by the service and provided to a user for this purpose may be used. However, the information exchanged in the dating service is not illustrated in FIG. 3. A further assumption is that Anna and Bert are registered users of the service.

After agreeing (point 3-0) to use the service and on the session identifier for the service, Anna creates a short message containing the agreed session identifier and parameters (i.e. attributes) indicating that Anna wants to know Bert's first name and surname, gender and age, and addresses the message to the person-to-person mobile ID service. Then Anna's mobile device UE-A sends message 3-1 to a server providing the service. Bert also creates a short message containing the agreed session identifier and parameters indicating that Bert wants to know Anna's age, and addresses the message to the MobileID for P2P service. Message 3-2 is then sent from Bert's mobile terminal UE-B.

When the server receives message 3-1, it detects that it is from a registered user and extracts, in point 3-3, the session identifier from the requests, compares it to those in entries of pending service cases, finds no match and therefore detects a new service case. In response to the new service case (i.e. a new service session), the server creates a corresponding entry to which it adds Anna's mobile number MSISDN and the parameters indicated in message 3-1, and starts, in point 3-3, to wait for a short message containing the same session identifier. When the server receives message 3-2, it detects that it is from a registered user and extracts, in point 3-3, the session identifier from the requests, compares it to those in entries of open service cases, finds a match and therefore triggers, in point 3-3, the mobile ID authentication service. As a consequence, two flash short messages are created, message 3-4 to UE-A (or more precisely, to the mobile ID in Anna's SIM inserted into UE-A), the message being encrypted by Anna's public key, and message 3-5 to UE-B (or more precisely, to the mobile ID in Bert's SIM inserted into UE-B), the message being encrypted by Bert's public key, both messages containing a following question: "Do you want to exchange mobile ID info with your friend: session code dating11?". It should be appreciated that this is just an example of the message content, the message could also indicate the requested information more specifically, for example.

In an implementation, the server is configured to take into account a risk that in addition to Bert and Anna, other persons may have agreed to use the same identifier "dating11" for their person-to-person mobile ID service. In the implementation, if independent session identifiers (i.e. "dating11") match in point 3-3, the server may be configured to add mobile phone numbers to messages 3-4 and 3-5 to be shown to the persons (Anna's number to Bert and Bert's number to Anna, or both numbers to both), if the mobile phone numbers are not unlisted (meaning that they are secret and showing them is not allowed). If at least one of the numbers is unlisted, then the server may prompt the first user (in this example Anna) to provide a further session identifier, or the server may generate a new session identifier and send it to the first user, prompting the first user to pass the information to the second user, and then both users may send another request that may contain the new session identifier generated by the server or the original and further session identifiers or the further session identifier so that the server is able, by associating mobile phone numbers with session identifiers, ensure that proper parties are connected to the session. Alternatively, the server may provide additional parameters when the first user is requesting a person-to-person mobile ID service.

In response to receiving message 3-4, the mobile ID in the UE-A decrypts the message by using Anna's private key, and shows the content via the user interface to Anna. Anna confirms her willingness (i.e. provides an acknowledgement) by keying her password for mobile ID services. Then the mobile ID in the UE-A checks the password, encrypts the content shown to the user by using Anna's private key and sends the encrypted content in message 3-6 to the server.

Correspondingly, in response to receiving message 3-5, the mobile ID in the UE-B decrypts the message by using Bert's private key, shows the content via the user interface to Bert. Bert confirms his willingness (i.e. provides an acknowledgement) by keying his password for mobile ID services. Then the mobile ID in the UE-B checks the password, encrypts the content shown to the user by using Bert's private key and sends the encrypted content in message 3-7 to the server.

The server detects that a response is received from both participants of the service case and checks, in point 3-8, the outcome of the authentications. In this case both allowed sending of the information, and the server obtains the requested information on Anna and on Bert from the server's memory. The server creates, in point 3-8, corresponding flash short messages, i.e. message 3-9 to Anna containing "Bert Smith, 26 years, male" and message 3-10 to Bert containing "23". UE-A shows (point 3-11) the content of message 3-9 to Anna and UE-B shows (point 3-12) the content of message 3-10 to Bert. Then Anna and Bert may agree when and where to meet. Since both were registered users, some additional information, like a photo, may be added to messages 3-9 and 3-10, in response to the personal data indicating that the person wants that a photo is added when the name or age is authenticated, for example.

In an implementation, the additional data of a registered person, such as a link to an identification card, may replace the requested information, such as age and/or name, shown to the user. In other words, in messages 3-9 and 3-10 Anna and Bert could receive a link to each others identification cards maintained in the Internet by a trusted party.

In an embodiment, a person-to-person mobile ID is used for a group. In the embodiment, message 3-1 contains a number indicating the size of the group, members of which will authenticate pieces of personal data to each other, or to the sender of message 3-1. In the embodiment, the server would maintain "counter requests", i.e. message 3-2 from different persons and monitor that the number of requests does not exceed the size of the group. Depending on the implementation, the authentication may be triggered when all (except the sender of message 3-1) have sent message 3-2 or every time there is a match.

In another embodiment, instead of an agreed session identifier, a combination of mobile phone numbers is used as a case identifier. For this purpose the persons exchange their mobile phone numbers. For example, Anna sends or tells her MSISDN to Bert to be added to the request instead of the session identifier, and Bert sends or tells his MSISDN to Anna to be added to the request instead of the session identifier, so that message 3-1 will contain Bert's MSISDN and message 3-2 Anna's MSISDN. In the embodiment, the server associates the sender's MSISDN with the MSISDN in the message and uses the association as if it was a session identifier (two same MSISDNs associated to each other is a service case match).

FIG. 4 is a simplified chart illustrating signalling according to another embodiment which differs from the embodiment illustrated in FIG. 3 in that the service itself creates session identifiers. Using the same example, in the embodiment Anna and Bert may or may not agree beforehand on using the person-to-person mobile ID service.

Anna wants to be sure that Bert is what he claims to be and creates a short message containing parameters indicating that Anna wants to know Bert's first name and surname, gender and age. Then Anna's mobile device UE-A sends message 4-1 to a server providing the service, as described above with FIG. 3.

When the server receives message 4-1, it detects, in point 4-2, that the message is from a registered user. Further since message 4-1 contains no session identifier the server detects, in point 4-2, a new service case. In response to the new service case, the server creates a corresponding entry to which the server adds Anna's MSISDN and the parameters indicated in message 4-1, and triggers, in point 4-2, the mobile ID authentication service for Anna. As a consequence, a flash short message, message 4-3, is created and sent to UE-A, the message being encrypted by Anna's public key and containing a following question: "Do you want to exchange mobile ID info with your friend? ", for example.

In response to receiving message 4-3, the mobile ID in the UE-A decrypts the message by using Anna's private key and shows the content via the user interface to Anna. Anna confirms her willingness (i.e. provides an acknowledgement) by keying her password for mobile ID services. Then the mobile ID in the UE-A checks the password, creates a message indicating the outcome of the check, encrypts the message by using Anna's private key and sends message 4-4 to the server.

In response to receiving message 4-4, the server checks, in point 4-5, the outcome of the authentication. In this case Anna allowed the sending of the information and the server generates, in point 4-5, a session identifier, adds it to the corresponding entry, creates, in point 4-5, a flash message containing following information "The session identifier to be used with this request is verify39", and sends message 4-6 to Anna. Then the server starts, in point 4-5, to wait for a request containing the session identifier.

In response to receiving message 4-6, the mobile device shows, in point 4-7, the content via the user interface to Anna. Then Anna requests Bert to authenticate his information by using the service with the session identifier. The request and the session identifier may be sent over the dating service to Bert or by means of a flash short message, for example, this information exchange 4-8 being illustrated by a dashed line in FIG. 4 between Anna's and Bert's mobile devices.

When Bert receives the request and the session identifier, he creates a short message containing the session identifier, and Bert's mobile device UE-B sends message 4-9 to the server.

When the server receives message 4-9, it detects, in point 4-10, that the message is from a registered user. Further, the server detects, in point 4-10, that message contains a session identifier, compares it to those in the entries of pending service cases, finds a match and therefore triggers, in point 4-10, a mobile ID authentication service for Bert. For that purpose, the server creates a flash short message, message 4-11, to UE-B, the message being encrypted by Bert's public key and containing a following question: "Do you want to exchange mobile ID info with your friend, identifier is verify 39? ", for example.

In response to receiving message 4-11, the mobile ID in the UE-B decrypts the message by using Bert's private key and shows the content via the user interface to Bert. Bert confirms his willingness (i.e. provides an acknowledgement) by keying his password for mobile ID services. Then the mobile ID in the UE-B checks the password, creates a message indicating the outcome of the check, encrypts the message by using Bert's private key and sends message 4-12 to the server.

When the server receives message 4-12, it checks, in point 4-13, the outcome of the authentication. Since in this example both allowed the sending of the information, the server obtains the requested information on Anna and on Bert from the server's memory and creates corresponding flash short messages, i.e. message 4-14 to Anna containing "Bert Smith, 26 years, male" and message 4-15 to Bert containing "Anna Johnson, 23 years, female". As described above, UE-A shows the content of message 4-14 to Anna and UE-B shows the content of message 4-15 to Bert. Then Anna and Bert may agree when and where to meet.

In the above examples Anna and Bert allow pieces of their personal information to be shown to the other. Depending on the implementation, if Anna, for example, does not allow and Bert does, Bert's information may or may not be obtained, sent and shown to Anna. However, Anna's information is not obtained, sent or shown.

In the above example it is assumed that Anna decides the pieces of information that are to be authenticated, and therefore Bert does not need to add parameters to request 5-9. If Bert adds parameters, they may be ignored. However, in another example also Bert needs to add parameters, and they are checked against parameters given by Anna. If the parameters differ, for example Anna indicated age and gender and Bert age and name, the service may be terminated. Another possibility is that information indicated by the parameters in message 4-1 and in message 4-9, i.e. age in the example, is obtained and shown to both users.

Although it is assumed in the above that Anna and Bert use the same authentication method, it should be appreciated that Anna could use a different method than Bert; it suffices that the personal data is authenticated in a trustworthy manner.

FIG. 5 is a simplified chart illustrating signalling according to a further example. Let us assume that Anton is going to meet his friends at a pub called Silvers. Unfortunately Anton left his printed identification card at home. Anton looks very young for his age and therefore the doorman asks Anton whether he has subscribed to a mobile ID service. Since Anton says yes, the doorman suggests using a person-to-person mobile ID service.

Anton agrees and the doorman sends message 5-1 to the service using Silver's mobile device UE-S. Message 5-1 contains a request for a session ID. However, no parameters are included since in the example it is assumed that the parameters are stored as part of registered user information on the person-to-person service.

In response to receiving message 5-1 from UE-S, the server detects that Silver has registered to the service as an authority and has a service provider interface to the service. Therefore the server obtains, in point 5-2, the service specifications of Silver, the service specifications in the example being that age must be authenticated, creates, in point 5-2, an entry for the request, generates, in point 5-2, a session identifier, adds it to the corresponding entry, creates, in point 5-2, a flash message 5-3 containing the following information "The session identifier to be used with this request is Silver47", and sends message 5-3 to UE-S. Although it is assumed in the example that message 5-3 is not encrypted, it may be encrypted by Silver's public key before sending (and then the mobile ID in UE-S takes care of showing the content). For example, in an embodiment a service provider interface is always associated with a corresponding public key and thus it is easily available. Then the server starts, in point 5-2, to wait for a request containing the session identifier.

In response to receiving message 5-3, UE-S shows, in point 5-4, the content via the user interface to the doorman. The doorman then shows the session identifier to Anton (shown by dashed line 5-5 in FIG. 5), who then creates a short message containing the session identifier and addresses the message to the server. Then Anton's mobile device UE-A sends message 5-6 to the server.

When the server receives message 5-6, it detects, in point 5-7, that message 5-6 contains a session identifier, compares it to those in the entries of open service cases, finds a match and therefore triggers, in point 5-7, a mobile ID authentication service for Anton. For that purpose, the server creates a flash short message, message 5-8, to UE-A, the message being encrypted by Anton's public key and containing an indication of a requested information (age in this example) and the following question: "Do you want to show your mobile ID information to your friend, identifier is Silver47?", for example. (Although Anton is not registered to person-to-person mobile ID service, Anton is registered to mobile ID service and therefore Anton's home MSSP can be found on the basis of Anton's mobile phone number.)

In response to receiving message 5-8, the mobile ID in the UE-A decrypts the message by using Anton's private key, and shows the question via the user interface to Anton. Anton confirms his willingness (i.e. provides an acknowledgement) by keying his password for mobile ID services. Then the mobile ID in the UE-A checks the password, creates a message indicating the outcome of the check and containing the requested piece of Anton's personal data, encrypts the message by using Anton's private key and sends message 5-9 to the server.

When the server receives message 5-9, it checks, in point 5-10, the outcome of the authentication. Since in this example Anton allowed the sending of the information, the server extracts the requested information on Anton from message 5-9, creates a flash short message, message 5-11, to UE-S, the message containing "19 years", and sends message 5-11. As described above, UE-S shows the content of message 5-11 to the doorman.

As can be seen from the above example, anonymous identification (i.e. showing only Anton's age to the doorman) without changing any personal data is provided by the embodiment.

Figure 6:
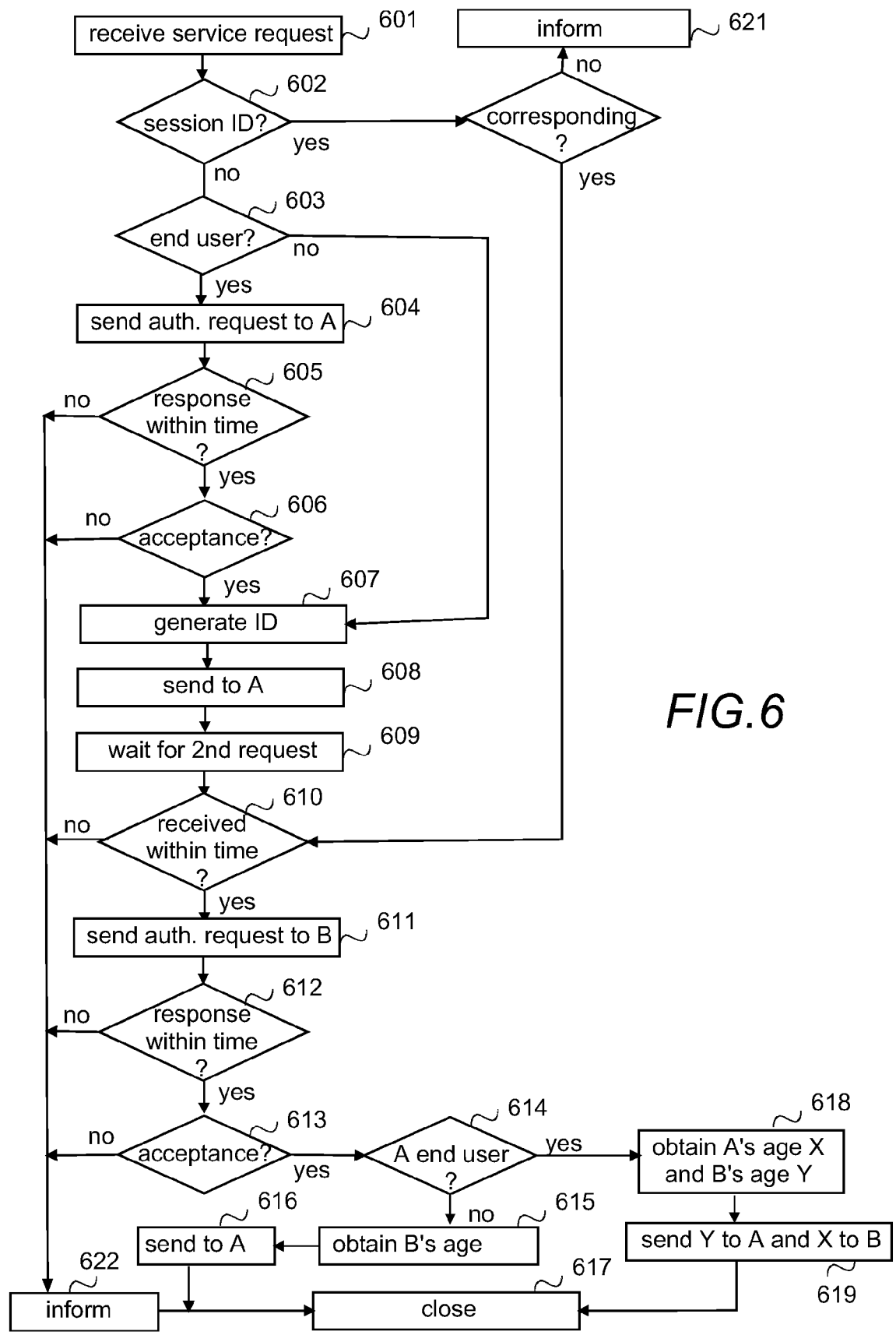

FIG. 6 is a flow chart illustrating a functionality of the server in an embodiment in which the session identifiers are generated by the server in each case, the number to which the service requester sends the request indicating the requested personal data, a request without a session identifier indicating that there is no pending case and a request with a session identifier indicating that the request is the second request and it is for a pending case. In the example illustrated in FIG. 6, the sender of the first request is denoted by A and the later requester denoted by B. Further, here the term "authority" refers to end users registered as service providers, including state authorities, public administration and different companies. The term "end user" refers here to a person as an end user.

FIG. 6 starts when a request, in the example a short message, is received, in step 601, in the server, the short message being addressed to an "age authentication" service in the example. The server checks, in step 602, whether or not the message contains a session identifier. If no, the server checks, in point 603, whether the sender is an end user or an authority. The detection may be performed on the basis of the interface via which the short message was received, for example on the basis of the address (or phone number) used.

If the sender (A) is an end user, the server sends, in step 604, an authentication request to A, the authentication request indicating that an age service is requested and including the generated session id. Then the server waits, in step 605, for a predetermined period of time whether an authentication response is received in time from A. If the authentication response is received in time and it is an acceptance (step 606), the server generates, in step 607, a session identifier and sends it to A in step 608. Then the server starts, in step 609, to wait for a predetermined period of time, which may be different from the time period of step 605, for a service request containing the generated session identifier, i.e. the second service request relating to the pending service case.

If the sender (A) is an authority (step 603), the server proceeds directly to step 607 and continues with generating a session identifier.

If the service request contained a session identifier, it is a second request and the server maps the session identifier with pending cases session identifiers, i.e. checks, in point 620, whether a case with a corresponding session identifier is found. If yes, the server checks, in point 610, whether the request is received within the predetermined time limit. If yes, the server sends, in step 611, an authentication request to B, the authentication request indicating that an age service is requested and including the generated session id. Then the server waits, in step 612, for a predetermined period of time, whether an authentication response is received from B. If the authentication response is received in time (step 612) and it is an acceptance (step 613), and A is an authority (step 614), the server obtains, in step 615, B's age (or the date of birth and calculates the age), sends, in step 616, B's age to A, and closes the service case in step 617. If the authentication response is received in time (step 612) and it is an acceptance (step 613) and A is an end user (step 614) the server obtains, in step 618, A's age X (or the date of birth and calculates the age) and B's age Y, sends, in step 619, A's age to B and B's age to A, and closes, in step 617, the service case.

If the mapping of the second request fails (step 620), end user B is informed on the failure by sending, in step 621, a messaged "no corresponding session identifier is found", for example.

If the authentication response from A (step 605) or the second request (step 610) or the authentication response from B (step 612) is not received in time or no acceptance was given (step 606 and step 613), the end user (or end users) are informed, in step 622, that the service request is cancelled, and the service case is closed in step 617.

Figure 7:
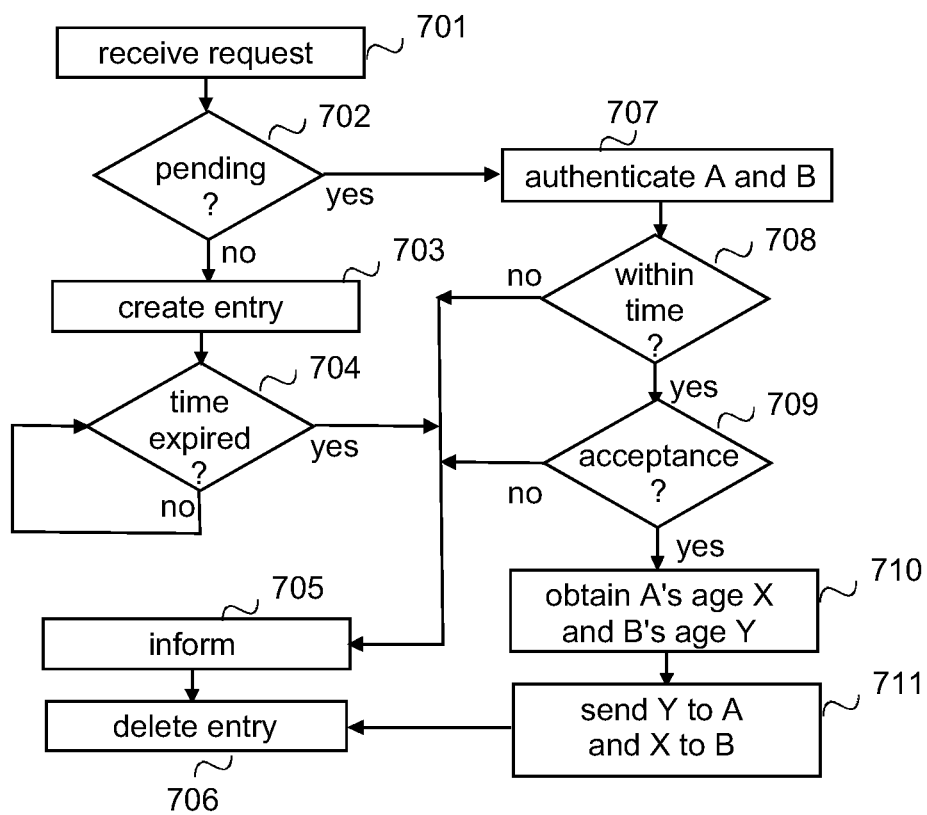
FIGS. 6 and 7 are flow charts illustrating embodiments of the invention.

FIG. 7 illustrates a functionality of a server according to another example. Also in the example illustrated in FIG. 7, the sender of the first request is denoted by A and the later requester denoted by B.

FIG. 7 starts when a short message, i.e. a service request, is received, in step 701, from a mobile device, the short message sender's mobile number being MSISDN1, the short message containing MSISDN2 and a parameter "age".

The server checks, in step 702, whether or not there is a pending service case having the combination of MSISDN1 and MSISDN2. If no such service case exists, the server creates, in step 703, a corresponding case entry with the indicated parameter "age", and starts, in step 704, to wait for a predetermined time for a second request relating to the service case (i.e. a request from another end user having MSISDN2) and triggering the authentication. If the time expires before the second request is received and authentication triggered (step 704), A is informed, in step 705, on a service failure and the service case is closed by deleting the corresponding entry in step 706.

If a corresponding entry is still pending (step 702), i.e. an entry created earlier in response to a short message received from MSISDN2, the short message containing MSISDN1 and one or more parameters exists, the request received in step 701 is the second request received within the predetermined period of time. Therefore the server triggers, in step 707, an authentication of A and B. The triggering of the authentication also closes the timer monitoring (step 704) whether or not a second request is received in time. After triggering the authentication, the server waits, in step 708, for a predetermined period of time whether authentication responses are received in time from A and B. If the authentication responses are received in time (step 708) and both of them include an acceptance (step 709) to authenticate personal data, the server obtains, in step 710, A's and B's personal data according to parameters in B's and A's requests, and sends, in step 711, obtained B's personal data to A and obtained A's personal data to B. Then the server deletes, in step 706, the corresponding entry.

The steps/points, messages and related functions described above in FIGS. 3 to 7 are in no absolute chronological order, and some of the steps/points may be performed and/or messages sent simultaneously or in an order differing from the given one. Other functions can also be executed between the points or steps or within the steps/points and other messages sent between the illustrated messages, such as sending acknowledgements, and checking whether or not an end user has subscribed to the service. Some of the functions or steps/points or part of steps/points can also be left out or replaced by a corresponding function or step/point or part of a step/point. Further, steps/points and/or messages described with different embodiments may be combined to obtain further embodiments. For example, end user requests may be handled as disclosed in FIG. 7 (i.e. with person end users), and as disclosed in FIG. 6 (i.e. with authority end users). The different ways disclosed above to detect which parameters are requested may be used in all embodiments. The messages are only exemplary and may even comprise several separate messages for transmitting the same information. In addition, the messages may also contain other information. Depending on the network technologies involved, other entities than those described above may participate in the signalling.

As is evident from the above examples, the person-to-person mobile ID service allows an end user to authenticate in a trustworthy manner pieces of personal data given by another end user and vice versa, remotely or in a face-to-face situation, by merely using their mobile phones. Further, no personal data on a user is given to another user without an explicit consent from the former.

In the above, age, name and gender have been used as examples of personal data, without restricting the personal data to be authenticated to these. Other examples include location, mobile phone number, social security number and whether a person has a valid driving license.

Although in the above, the number of group members was received as a parameter, it may be stored during registration. For example, in the example of FIG. 5, Silver's registration information could contain an indication that the session may be used for authenticating N persons.

As disclosed above, the service request may contain parameters indicating what information is requested. Other alternatives include that the used address information indicates the information (for example 17345 is for age, 17367 is for name, and 17656 is for age and name) or the requester has predefined in his service subscription the information to be requested. Thus, end users may obtain authentication of only some pieces of other person's personal data, depending on the need.

Although different embodiments have been described above assuming that a password is used, it should be appreciated that the embodiments can be implemented by other personal identification means, such as by means of biometric identifiers.

It will be obvious to a person skilled in the art that, as the technology advances, the inventive concept can be implemented in various ways. The invention and its embodiments are not limited to the examples described above but may vary within the scope of the claims.

What is claimed is:

1. A method comprising:
    receiving a first request from a first end user device indicating that one or more specific pieces of personal data on a second user is to be authenticated;
    creating a pending session for the request,
    receiving a second request from a second end user device, the second request containing at least information with which the request can be mapped against pending sessions;
    generating a session identifier in response to the first request, sending the session identifier to the first user device;
    if the second request contains the generated session identifier, detecting a match;
    if there is a match, performing at least the following:
    sending an authentication request to the second end user device to authenticate the second user by means of a mobile identification scheme;
    receiving an authentication response from the second end user device; and
    if the authentication response from the second end user device indicates that the authentication succeeded, obtaining the specified pieces of personal data of the second user from a memory whereto personal data for mobile identification is stored, and sending the obtained pieces of personal data of the second user to the first user device.

2. A method as claimed in claim 1, further comprising:
    sending an authentication request to the first end user device to authenticate the first user by means of the mobile identification scheme;
    receiving an authentication response from the first end user device; and
    if the authentication of the first end user device and the second end user device succeeds,
    obtaining the specified pieces of personal data of the second user and specified pieces of personal data of the first user from the memory, sending the obtained pieces of personal data of the second user to the first user device, and sending the obtained pieces of personal data of the first user to the second user device.

3. A method as claimed in claim 1, further comprising:
    receiving in the first request a session identifier; and
    if the second request contains the same session identifier, detecting a match.

4. A method as claimed in claim 1, further comprising:
receiving in the first request a mobile phone number of the second user from the first end user device using a mobile phone number of the first user;
if the second request is received from a device using the mobile phone number of the second user, and the second request contains the mobile phone number of the first user, detecting a match.

5. A non-transitory computer readable medium comprising computer program code which when run on a computer, will cause the computer to:
generate a session identifier in response to the first request, sending the session identifier to the first user device;
if the second request contains the generated session identifier, detecting a match;
create, in response to receiving from a first end user device a first request indicating that one or more specific piece of personal data on a second user is to be authenticated, a pending session for the first request,
map, in response to receiving from a second end user device a second request containing at least information with which the request can be mapped, the second request against pending sessions to find out whether there is a match;
send, in response to a match, an authentication request to the second end user device to authenticate the second user by means of a mobile identification scheme;
obtain, in response to receiving from the second end user device an authentication response indicating that the authentication succeeded, the specified pieces of personal data of the second user from a memory whereto personal data for mobile identification is stored; and
send the obtained pieces of personal data of the second user to the first user device.

6. A non-transitory computer readable medium according to claim 5, which when run on a computer, will further cause the computer to:
generate a session identifier in response to the first request, send the session identifier to the first user device; and
detect a match in response to the second request containing the generated session identifier.

7. A non-transitory computer readable medium according to claim 6, which when run on a computer, will further cause the computer to:
send an authentication request to the first end user device to authenticate the first user by means of a mobile identification scheme;
obtain, in response to receiving also from the first end user device an authentication response indicating that the authentication succeeded, the specified pieces of personal data of the second user and specified pieces of personal data of the first user from the memory; and
send the obtained pieces of personal data of the second user to the first user device, and the obtained pieces of personal data of the first user to the second user device.

8. A non-transitory computer readable medium according to claim 5, which when run on a computer, will further cause the computer to:
compare a session identifier received in the second request with a session identifier received in the first request; and
detect a match, if the session identifier received in the second request is the same as the session identifier received in the first request.

9. A non-transitory computer readable medium according to claim 5, which when run on a computer, will further cause the computer to detect a match in response to the first request being received from a first mobile phone number and containing a second mobile phone number, and the second request being received from the second mobile phone, and containing the first mobile phone number.

10. An apparatus comprising:
at least one receiver;
at least one transmitter;
at least one processor; and
at least one memory including computer program code;
the at least one memory and the computer program code are configured to, with the at least one processor, receiver and transmitter, cause the apparatus at least to:
generate a session identifier in response to the first request, sending the session identifier to the first user device;
if the second request contains the generated session identifier, detecting a match;
receive a first request from a first end user device, the first request indicating that one or more specific piece of personal data on a second user is to be authenticated,
create a pending session for the request;
receive a second request from a second end user device, the second request containing at least information with which the request can be mapped against pending sessions;
map the second request against pending sessions to detect a match;
send, in response to the match being detected, an authentication request to the second end user device to authenticate the second user by means of a mobile identification scheme;
receive an authentication response from the second end user device;
obtain, in response to the authentication response indicating that the authentication succeeded, the specified pieces of personal data of the second user from a memory whereto personal data for mobile identification is stored;
and send the obtained pieces of personal data of the second user to the first user device.

11. An apparatus as claimed in claim 10, wherein the at least one memory and the computer program code are configured to, with the at least one processor, receiver and transmitter, further cause the apparatus at least to:
generate a session identifier in response to the first request, send the session identifier to the first user device; and
detect a match, if the second request contains the generated session identifier.

12. An apparatus as claimed in claim 11, wherein the at least one memory and the computer program code are configured to, with the at least one processor, receiver and transmitter, further cause the apparatus at least to:
send an authentication request to the first end user device to authenticate the first user by means of a mobile identification scheme;
receive an authentication response from the first end user device;
obtain, if the authentication of both the first end user device and the second end user device succeeded, the specified pieces of personal data of the second user and specified pieces of personal data of the first user from the memory; and
send the obtained pieces of personal data of the second user to the first user device,
and the obtained pieces of personal data of the first user to the second user device.

13. An apparatus as claimed in claim 10, wherein the at least one memory and the computer program code are configured to, with the at least one processor, receiver and transmitter, further cause the apparatus at least to:

receive in the first request a session identifier; and
detecting a match, if the second request contains the same session identifier in the information with which the second request can be mapped against pending sessions.

14. An apparatus as claimed in claim 10, wherein the at least one memory and the computer program code are configured to, with the at least one processor, receiver and transmitter, further cause the apparatus at least to:

receive in the first request a mobile phone number of the second user from the first end user device using a mobile phone number of the first user;
detect a match, if the second request is received from a device using the mobile phone number of the second user, and the second request contains the mobile phone number wherefrom the first request was received.

15. An apparatus as claimed in claim 10, wherein the apparatus is a server configured to provide person-to-person mobile identification service.

16. A system comprising at least an authentication subsystem for mobile identification, the authentication subsystem comprising public keys, each associated with personal data of a person during a mobile certificate issuance;

a first and a second end user device;
a subscriber identity module comprising an authentication application and a keypair of a public key and private key of for the authentication subsystem, the subscriber module being inserted in the second end user device;
a memory configured to store pieces of personal data of a user of the subscriber identity module, at least some of the pieces of personal data being inserted into the memory during the mobile certificate issuance and associated with the corresponding public key;
a server configured to:
use the authentication subsystem for the authentication;
generate a session identifier in response to the first request, sending the session identifier to the first user device;
if the second request contains the generated session identifier, detecting a match;
create, in response to receiving from the first end user device a first request indicating that one or more specific piece of personal data on a second user is to be authenticated, a pending session for the first request,
map, in response to receiving from the second end user device a second request containing at least information with which the request can be mapped, the second request against pending sessions to find out whether there is a match;
send, in response to a match, an authentication request to the second end user device to authenticate the second user by means of a mobile identification scheme;
obtain, in response to receiving from the second end user device an authentication response indicating that the authentication succeeded, the specified pieces of personal data of the second user from a memory whereto personal data for mobile identification is stored; and
send the obtained pieces of personal data of the second user to the first user device.

17. A system as claimed in claim 16, wherein the server is further configured to:

generate a session identifier in response to the first request, send the session identifier to the first user device; and
detect a match in response to the second request containing the generated session identifier.

18. A system as claimed in claim 16, wherein the server is further configured to:

compare a session identifier received in the second request with a session identifier received in the first request; and
detect a match, if the session identifier received in the second request is the same as the session identifier received in the first request.

19. A system as claimed in claim 16, wherein the server is configured to detect a match in response to the first request being received from a first mobile phone number and containing a second mobile phone number, and the second request being received from the second mobile phone, and containing the first mobile phone number.

* * * * *